May 28, 1935.  H. E. BIERBAUM  2,002,654
METHOD OF PURIFICATION OF HALOGEN CONTAINING SOLUTIONS
Filed July 15, 1932
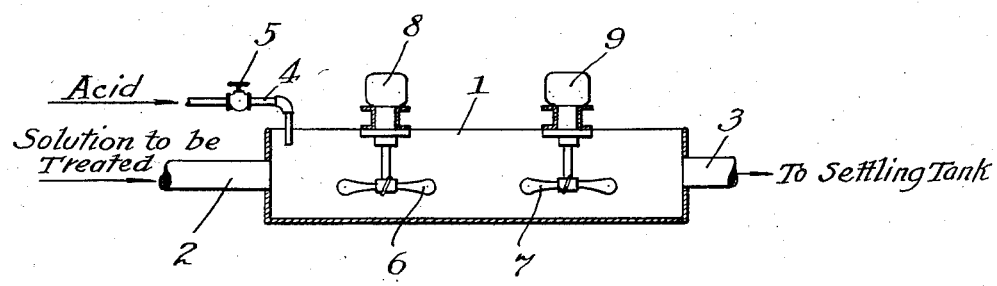
INVENTOR
*Harry E. Bierbaum*,
BY
ATTORNEYS Patented May 28, 1935

2,002,654

UNITED STATES PATENT OFFICE 2,002,654

METHOD OF PURIFICATION OF HALOGEN-CONTAINING SOLUTIONS

Harry E. Bierbaum, Long Beach, Calif., assignor to General Salt Company, Ltd., Los Angeles, Calif., a corporation of California Application July 15, 1932, Serial No. 622,676

1 Claim. (Cl. 23—39)

This invention relates to the purification of solutions containing halogens, and particularly, to the removal from brines or other solutions containing chemically combined iodine or other halogen of impurities whose removal is of benefit in facilitating the recovery of such iodine or other halogen from said brines or solutions. The invention is particularly applicable to the treatment of brine containing iodides or other iodine compounds, or to the treatment of liquors containing partially refined iodides or other iodine compounds such as are obtained in certain processes for recovery of iodine from such brines. However, it will be understood that the process may also be used for the treatment of brines, liquors or other solutions containing compounds of bromine or other halogen.

The principal object of the invention is to provide a simple and effective method for the removal from such solutions of impurities which, if allowed to remain therein, would either interfere with the subsequent steps of the process used for recovery of the halogen therefrom, or would contaminate the halogen product so recovered.

An important object of the invention is to provide a simple, economical and effective means for removing colloidal or finely divided clay or earthy materials contained in suspension in the solution to be treated.

A further object of the invention is to provide for removal of oily materials, such as petroleum or hydrocarbon oils which may be present in small amounts, usually in emulsified form, in the solution to be treated. Certain brines containing halogen compounds also carry small quantities of colloidal clay and emulsified or suspended oil, and this is particularly true of brines of subterranean origin, such as oil field brines, that is to say, brines separated from crude petroleum obtained in the operation of oil wells. If these impurities are not removed from the brine, they interfere with the subsequent treatment of the brine for recovery of iodine or other halogen therefrom and also tend to contaminate the final production. For example, in case the method employed for recovery of iodine or other halogen consists in oxidation and adsorption on charcoal, any impurities in the nature of colloidal clay or oil tend to blind the adsorbent and impair the effectiveness thereof.

A further object of the invention is to remove sulphur compounds, and particularly hydrogen sulphide and other sulphides, therefrom. These sulphides, if allowed to remain in the solution, also interfere with the subsequent recovery of the halogen therefrom.

I have found that the above objects may be accomplished, and that solutions of the type above described may advantageously be purified, by adding sufficient sulphuric acid or other acid to the solution to decompose sulphide impurities present and render the solution slightly acid, and then actively agitating the acidified solution, preferably in such manner as to promote contact of air therewith, and thereafter allowing the solution to stand or subjecting the same to a settling operation.

The accompanying drawing illustrates, somewhat diagrammatically, a simple form of apparatus which may be used for carrying out the above described process in accordance with this invention.

In this drawing, an open-top agitation chamber is indicated at 1. The solution to be treated is delivered to this chamber through conduit means 2 and the solution is delivered from the other end of said chamber through conduit 3 to suitable settling tank or basin. The acid may be introduced into the solution substantially immediately after it enters the agitation chamber, for example through supply pipe 4, provided with regulating valve 5. Two rotary agitators 6 and 7, provided with driving means such as electric motors 8 and 9, are mounted within the agitation chamber 1 and positioned to agitate and aerate the solution during its passage therethrough from the inlet conduit 2 to the outlet conduit 3.

In applying the process of this invention, for example, to the purification of an oil field brine containing iodine in the form of iodide, and also containing sulphides, colloidal clay, and small amounts of oil, the brine is preferably first subjected to a preliminary settling operation, as by passing the same slowly through shallow ponds or basins, to remove any oil or other suspended impurities which are amenable to separation in this manner, and is then introduced through conduit 2 into chamber 1. An acid, such as sulphuric or hydrochloric acid is also introduced in suitable proportions through supply pipe 4. I have found that, with certain types of brine, good results are obtained by the use of 75 gallons of concentrated sulphuric acid to 300,000 gallons of brine, but it will be understood that these proportions may be varied considerably, depending upon the hydrogen ion concentration of the brine and on the nature of the materials contained therein. In general, however, the amount of acid added should be sufficient to render the same slightly acid, for example, to a pH value of about 3.5.

The agitators 6 and 7 serve to uniformly distribute the acid in the brine and also to aerate the same due to the churning action produced on the brine in contact with the air which is permitted free access to the surface of the brine in said chamber. Hydrogen sulphide contained in the brine, or produced by action of the acid on metallic sulphides contained therein, is evaporated and carried off in vapor form by the air, this evaporation process being facilitated by the contact of the air with the solution.

After thorough agitation and aeration, the brine is delivered through conduit 3 to settling basins, where it is permitted to remain for a relatively long period, for example for a period of 12 to 48 hours or longer. During this settling operation a considerable proportion of the colloidal clay or other earthy materials contained in the brine settle to the bottom of the settling basin, while oily impurities contained therein rise to the top thereof, so that the relatively clean brine freed from the major portion of these impurities may be removed from an intermediate level in the settling basin. It may be pointed out that the gravity separation of the colloidal clay and the oily impurities is greatly facilitated by the acidification of the brine, as such separation takes place much more rapidly in an acid solution than in a neutral or alkaline solution. The separated clay and earthy impurities collect at the bottom of the settling basin, whence they may be scraped or otherwise removed from time to time, while the oily impurities collect in the form of a scum or a thin layer on the surface of the brine in the settling basin and may be removed from time to time by skimming or in any other suitable manner.

If desired, the above operations may be repeated, the brine being again acidified, agitated, and allowed to settle. This second treatment results in a further removal of the above described impurities, and produces a very pure brine which is in a highly advantageous condition for subsequent treatment for the recovery of iodine therefrom.

The method of the present invention may also be applied to the treatment of halide-containing solutions obtained in an intermediate step of processes used for the recovery of iodine or other halogen from brines or other materials. For example one method of recovering halogens from brines containing compounds thereof consists in oxidizing or otherwise treating the halogen compounds contained in the brine to convert the same to the form of the free halogen, adsorbing the halogen thus formed on charcoal, liberating the adsorbed halogen from the charcoal by treatment with caustic soda solution to convert the same to the form of halides, and then separating and concentrating the resulting solution and treating the same to recover the pure halogen therefrom. The halide containing solution resulting from the caustic soda treatment in such process ordinarily contains small amounts of impurities such as clay or oils, which are not separated from the halogen in the preceding steps of the process.

In order to remove these residual impurities from such solution, the solution, preferably after concentration by evaporation of water therefrom, may be again acidified with sulphuric acid or other suitable acid. If desired the acidified solution may then be agitated, after which it is allowed to settle or stand for a period of from two to four days. During this settling or ageing of the acidified solution, the impurities such as clay and oil separate therefrom by gravity in substantially the same manner as above described, and the purified solution may then be drawn off in such manner as to leave the separated impurities behind. This purified solution may then be further treated for the recovery of pure halogen therefrom.

I claim:

In a process for recovering a halogen wherein a solution, containing chemically combined halogen and also containing sulphide impurities and finely divided suspended impurities whose presence interferes with the recovery of halogen in pure condition, is to be subjected to treatment to recover said halogen from the solution, the method of preliminary purification of the solution which comprises adding acid to the solution in sufficient amount to decompose sulphide impurities present in said solution and render the solution slightly acid, then agitating and aerating the acidified solution to remove therefrom hydrogen sulphide resulting from such decomposition, and then subjecting the acidified solution to a settling operation to remove suspended impurities therefrom, prior to the treatment of said solution to recover the halogen therefrom.

HARRY E. BIERBAUM.